United States Patent
Jang et al.

(10) Patent No.: US 9,810,879 B2
(45) Date of Patent: Nov. 7, 2017

(54) IMAGING LENS ASSEMBLY

(71) Applicants: Issac Jang, Shenzhen (CN); Jay Park, Shenzhen (CN)

(72) Inventors: Issac Jang, Shenzhen (CN); Jay Park, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 110 days.

(21) Appl. No.: 14/832,442

(22) Filed: Aug. 21, 2015

(65) Prior Publication Data
US 2016/0161712 A1    Jun. 9, 2016

(30) Foreign Application Priority Data
Dec. 5, 2014 (KR) .................. 10-2014-0174422

(51) Int. Cl.
*G02B 3/02* (2006.01)
*G02B 13/18* (2006.01)
*G02B 13/00* (2006.01)

(52) U.S. Cl.
CPC .............. *G02B 13/0035* (2013.01)

(58) Field of Classification Search
CPC  G02B 13/0045; G02B 13/18; G02B 13/0035; G02B 13/004
USPC .................................. 359/643–830
See application file for complete search history.

(56) References Cited

U.S. PATENT DOCUMENTS

2012/0194920 A1* 8/2012 Huang ............... G02B 13/0045
                                                                  359/714
2014/0218582 A1* 8/2014 Chen ........................ G02B 9/62
                                                                  348/335

* cited by examiner

*Primary Examiner* — Mahidere Sahle
(74) *Attorney, Agent, or Firm* — Na Xu; IPro, PLLC

(57) ABSTRACT

An imaging lens assembly is disclosed in the present disclosure. The imaging lens assembly includes, in order from an object side to an image side, a stop; a first lens having a positive refractive power, a convex object-side surface and a convex image-side surface; a second lens having a negative refractive power and a convex and meniscus shaped image-side surface; a third lens having a negative refractive power, an image-side surface being concave at a paraxial region and being convex and meniscus shaped at a peripheral region, and an object side-surface being concave at the paraxial region; the image-side surface of the third lens having an inflection point. At least one of the surfaces of three lenses is aspheric, f is a focal length of the imaging lens assembly; f1 is a focal length of the first lens and the imaging lens assembly satisfying following condition:

$$0 < \frac{f1}{f} < 1.0.$$

6 Claims, 2 Drawing Sheets

IMAGING LENS ASSEMBLY

FIELD OF THE INVENTION

The present invention relates to an imaging lens assembly, and more particularly to an imaging lens assembly which is suitable for installation into an image input device of a portable telephone or personal computer, a digital camera, a CCD camera used for monitoring purposes, a surveying device, or similar.

DESCRIPTION OF RELATED ART

Imaging apparatuses using solid-state image sensing devices such as CCD (Charge-Coupled Device) type image sensors and CMOS (Complementary Metal-Oxide Semiconductor) type image sensors include digital still cameras, digital video cameras, and the like. Imaging apparatuses using such solid-state image sensing devices are suitable for miniaturization, and hence have recently been mounted in compact information terminals such as cellular phone sets.

With increases in the miniaturization and pixel density of solid-state image sensing devices, demands have arisen for smaller and higher-performance imaging lenses assembly to be mounted in these imaging apparatuses. However, the imaging lens assembly in the related art includes three lenses and the first lens takes a meniscus shape so that the manufacture of the lens assembly is difficult. Additionally, a distance between an object-side surface of the first lens and the image plane becomes longer, which cause the imaging lens assembly difficult to be minimized.

Moreover, a stop is disposed between the first and second lenses, which broaden a distance between the first and second lenses, thus the imaging lens assembly cannot be produced with a compact size.

Accordingly, an improved imaging lens assembly which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to several embodiments.

Figure 1:
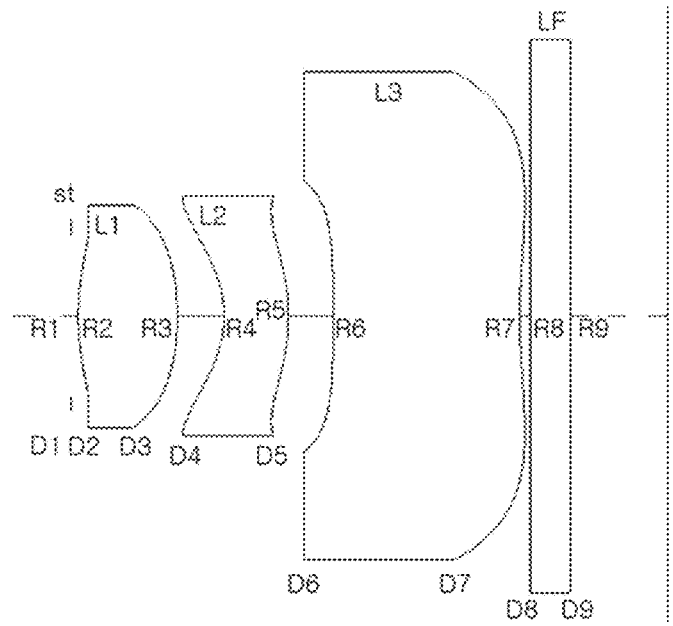
FIG. 1 is an illustrative structure of an imaging lens assembly related to a first embodiment of the present disclosure.
Figure 2:
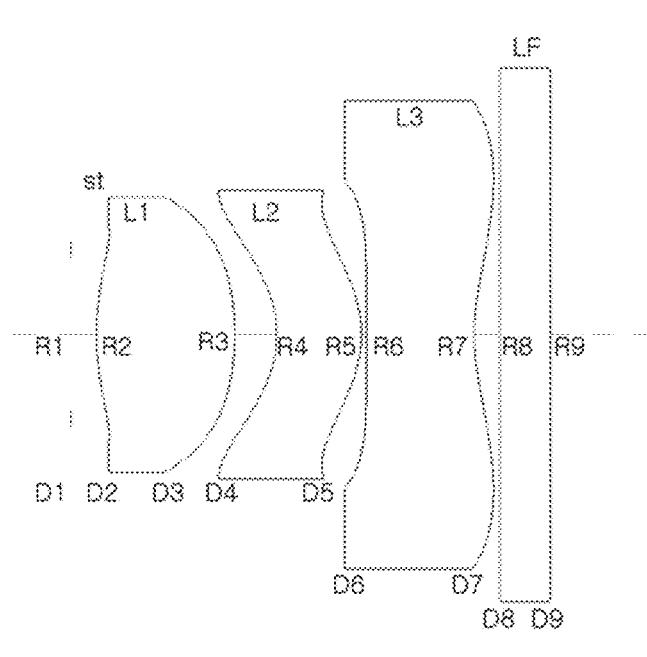
FIG. 2 is an illustrative structure of an imaging lens assembly related to a second embodiment of the present disclosure.

In FIG. 1 and FIG. 2, Ri (i=1, 2, 3, 4 . . . ) represents a curvature radius of a surface of a stop, lenses or a filter. Di(i=1, 2, 3, 4 . . . ) represents an axial thickness of a stop, lenses, a filter, or a distance between the lens and the filter.

Referring to FIG. 1 and FIG. 2, an imaging lens assembly comprises, in order from an object side to an image side, a stop St, a first lens L1, a second lens L2 and a third lens L3. The imaging lens assembly further comprises an optical means disposed between the third lens L3 and image plane Si, such as a filter.

The first lens L1 has a positive refractive power, a convex object-side surface and a convex image-side surface.

The second lens L2 has a negative refractive power, a convex and meniscus shaped image-side surface.

The third lens L3 has a negative refractive power. An image-side surface of the third lens L3 may have an inflection point. For example, one inflection point is formed on an image-side surface of the third lens L3. Thus, the third lens has an object-side surface being concave at a paraxial region and an image-side surface being concave at a paraxial region and being convex and meniscus shaped at a peripheral region. With such construction, it can decrease the incident angle of the light incident on the image plane effectively and facilitate the correction of the spherical aberration and the astigmatic field, which can improve the performance of the imaging lens assembly.

Optionally, there is no inflection point formed on the object-side surface of the third lens L3. Since no inflection point is formed on the object-side surface of the third lens, the advantage effect of the imaging lens assembly also can be realized. With such construction of the object-side surface of the third lens with no inflection point, it causes a lower production cost and a simpler manufacture process.

In the embodiment, the first lens L1 has a convex object-side surface and a convex image-side surface, which can be produced easily. The second lens L2 has a negative refractive power, which can shorten the total track length of the imaging lens assembly.

At least one of the surfaces of the three lenses L1, L2, L3 is aspheric. For example, all of the object-side surfaces and image-side surfaces of the three lenses L1, L2, L3 may be aspheric, which can shorten the total track length of the imaging lens assembly and provide a high performance for the imaging lens assembly.

In such case, when a focal length of the first lens is f1, a focal length of the second lens is f2 and a focal length of the third lens is f3, the value of |f1| is the maximum value, the value of |f2| may be the minimum value, the value of |f3| is substantially equal to that of |f2| and different from that of |f1| completely.

It is possible for producing a compact imaging lens assembly, since the focal length of the first lens is higher.

The compact imaging lens assembly satisfies the following condition:

$$0 < \frac{f1}{f} < 1.0 \quad (1)$$

Wherein, f is a focal length of the imaging lens assembly, f1 is the focal length of the first lens.

If the value exceeds the minimum limit of condition (1), the imaging lens assembly would have a negative refractive power. If the value exceeds the maximum limit of condition (1), the value of the positive refractive power of the first lens would become too small to construct a compact imaging lens assembly. Optionally, f1/f satisfies the following condition: 0.5<f1/f<0.7.

The stop St may be disposed in the object side of the imaging lens assembly such that the total track length of the imaging lens assembly can be reduced and the outer diameter of the imaging lens assembly also can be reduced, thus can minimize the product.

The imaging lens assembly also satisfies the following condition:

$$0.75 < \frac{TTL}{2y} < 1.0 \quad (2)$$

Wherein, TTL is an axial distance between the object-side surface of the first lens and the image plane; y is a maximum image height of the imaging lens assembly, i.e. a half of a diagonal length of an effective pixel area of the imaging lens assembly.

If the value exceeds the maximum limit of condition (2), the total track length of the imaging lens assembly would be increased, thus, the imaging lens assembly cannot be minimized. If the value exceeds the minimum limit of condition (2), the refractive power of the imaging lens assembly would become too higher to correct the distortion by the second and third lenses.

The imaging lens assembly further satisfies the following conditions:

$$-1.2 < \frac{R2}{R3} < 0 \quad (3)$$

Wherein, R2 is a curvature radius of the object-side surface of the first lens L1; R3 is a curvature radius of the image-side surface of the first lens L1.

If the value exceeds the maximum limit of condition (3), the first lens would be meniscus shaped and correct the astigmatic field of the first lens. Therefore, the first lens should be made of a material with a high abber number and a high refractive index. Thus, resin may not be used for the first lens.

If the value exceeds the minimum limit of condition (3), the curvature radius of the image-side surface of the first lens would become lower. With such construction, the curvature radius of the object-side surface of the second lens should be reduced for correcting the spherical aberration and astigmatic field.

According to the embodiment, the first, second and third lenses may be made of plastic material for reducing the weight of the imaging lens assembly.

The Abbe number of the first lens may be 50 or more. The Abbe number of the second lens may be ranged from 20 to 30. With such construction, the increased aberration caused by increased focal length can be corrected. When difference between the Abbe number of the first lens and that of the second lens exceeds 20, the focula that can reduce the contrast would be eliminated. In such case, the Abbe number of the second lens L2 may be ranged from 23 to 24.

In the embodiment, the equation of the aspheric surface profiles of the aforementioned lens assembly is expressed as follows:

$$z = \frac{CR^2}{1 + \sqrt{1 - (a1+1)C^2R^2}} + a4R^4 + a6R^6 + a8R^8 + a10R^{10} + a12R^{12}$$

$$R = \sqrt{X^2 + Y^2}, C = \frac{1}{radius}$$

Wherein, Z is a distance between a top point of the lens assembly and the optical axis; R is a distance between a top point of the lens and an axis perpendicular to the optical axis; C is a reciprocal of the curvature radius of the top point of the lens assembly; a1 is a conic coefficient; a4, a6, a8, a10 and a12 are aspherical coefficient.

Table 1 shows the detailed optical data of Embodiment 1 shown in FIG. 1 and the aspheric surface data are shown in Table 2 below.

TABLE 1

| Embodiment 1 | | | | | |
|---|---|---|---|---|---|
| f = 3.5246 mm, Fno = 2.8, DOF (depth of feild) = 33.41° | | | | | |
| Surface number | Surface shape | Curvature radius | thickness | refraction index | Abbe number |
| object | Sphere | Infinity | Infinity | | |
| stop | Sphere | Infinity | 0.05038 | | |
| 2 | Asphere | 1.81031 | 0.74371 | 1.5441 | 56.1000 |
| 3 | Asphere | −1.91805 | 0.35164 | | |
| 4 | Asphere | −0.78288 | 0.48398 | 1.6398 | 23.3000 |
| 5 | Asphere | −1.38040 | 0.33190 | | |
| 6 | Asphere | 37.32042 | 1.40150 | 1.5346 | 56.3000 |
| 7 | Asphere | 4.40234 | 0.07705 | | |
| 8 | Sphere | Infinity | 0.30000 | 1.523 | 54.5000 |
| 9 | Sphere | Infinity | 0.68518 | | |
| image | Sphere | Infinity | 0.04999 | | |

TABLE 2

| aspherical coefficient | | | | | |
|---|---|---|---|---|---|
| k | a4 (A) | a6 (B) | a8 (C) | a10 (D) | a12 (E) |
| −2.4369E+00 | −4.8199E−02 | −1.5914E−01 | −3.6265E−01 | 8.8572E−01 | −2.3466E+00 |
| 2.8491E+00 | −1.9630E−01 | 4.1122E−04 | −1.3754E−01 | 4.0799E−01 | −5.1903E−01 |
| −8.8816E−01 | 5.1972E−02 | 5.3586E−01 | −1.2886E−01 | −4.0696E−01 | 3.8092E−01 |
| −2.7066E+00 | −3.0404E−04 | 3.4753E−01 | −1.5951E−02 | −2.3539E−01 | 1.9190E−01 |
| −3.0686E+20 | −2.1237E−01 | 1.7836E−01 | −3.3693E−01 | 3.1527E−01 | −1.7713E−01 |
| −1.2977E−01 | −1.0195E−01 | 3.1183E−02 | −1.6079E−02 | 3.9677E−03 | −4.8053E−04 |

In Table 1, the curvature radius, the thickness and the focal length are shown in millimeters (mm) Surface numbers 2-9 represent the surfaces sequentially arranged from the object-side to the image-side along the optical axis. In Table 2, K represents the conic coefficient of the equation of the aspheric surface profiles; a4-a12 represents the aspheric coefficients ranging from the 4th order to 16th order. This information related to Table 1 and Table 2 applies also the Tables for the remaining embodiments, and so an explanation in this regard will not be provided again.

Figure 3:
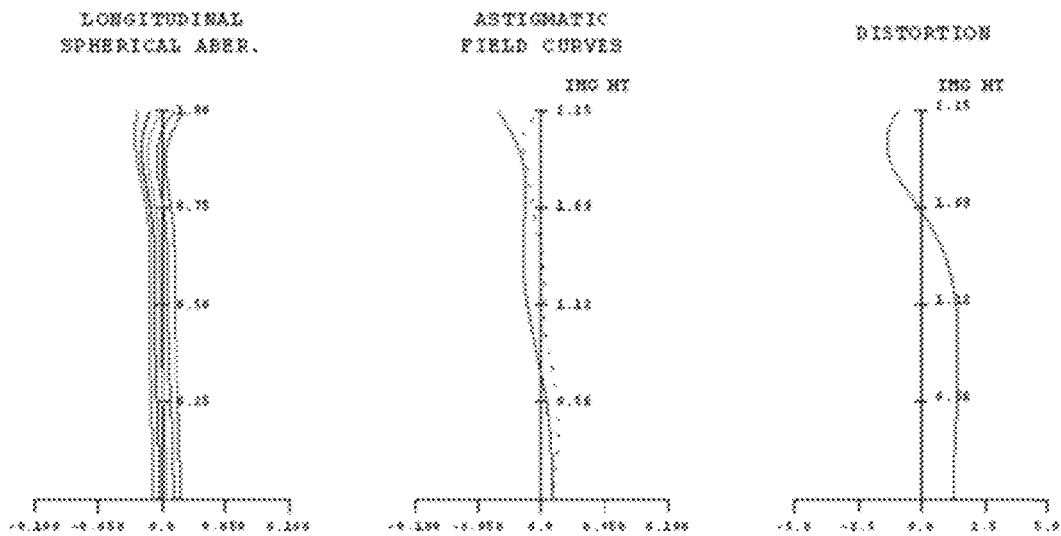
FIG. 3 shows a longitudinal spherical aberration curve, an astigmatic field curve and a distortion curve of the imaging lens assembly shown in FIG. 1.

FIG. 3 shows a longitudinal spherical aberration curve, astigmatic field curve and distortion curve of the imaging lens assembly according to Embodiment 1 shown in FIG. 1. The reference wavelengths corresponding to the longitudinal spherical aberration are 656.28 nm, 587.56 nm, 546.07 nm, 486.13 nm, and 435.83 nm. The reference wavelength corresponding to the astigmatic field curve and the distortion curve is 587.56 nm.

Table 3 shows the detailed optical data of Embodiment 2 shown in FIG. 2 and the aspheric surface data are shown in Table 4 below.

TABLE 3

Embodiment 2
f = 2.3412 mm, Fno = 2.6, DOF = 37.72°

| Surface number | | Curvature radius | thickness | refraction index | Abbe number |
|---|---|---|---|---|---|
| object | Sphere | Infinity | Infinity | | |
| stop | Sphere | Infinity | 0.15272 | | |
| 2 | Asphere | 1.62814 | 0.82557 | 1.5441 | 56.1000 |
| 3 | Asphere | −1.55901 | 0.25190 | | |
| 4 | Asphere | −0.64692 | 0.50638 | 1.6355 | 23.9000 |
| 5 | Asphere | −0.64750 | 0.02819 | | |
| 6 | Asphere | 21.73936 | 0.64339 | 1.6355 | 23.9000 |
| 7 | Asphere | 1.13931 | 0.15618 | | |
| 8 | Sphere | Infinity | 0.30000 | 1.523 | 54.5000 |
| 9 | Sphere | Infinity | 0.58564 | | |
| image | Sphere | Infinity | 0.05000 | | |

TABLE 4

| aspherical coefficient | | | | | |
|---|---|---|---|---|---|
| k | a4 (A) | a6 (B) | a8 (C) | a10 (D) | a12 (E) |
| −1.6329E+00 | −4.1367E−02 | −3.4354E−01 | −2.2212E−01 | 1.0758E+00 | −6.0747E+00 |
| 2.2287E+00 | −2.5262E−01 | −1.2815E−01 | 6.7407E−02 | 6.8545E−01 | −9.2802E−01 |
| −9.6969E−01 | 6.4898E−02 | 6.3942E−01 | −1.2820E−01 | −4.7250E−01 | 4.8942E−01 |
| −2.7895E+00 | −2.9806E−02 | 4.2906E−01 | 6.7552E−02 | −2.3026E−01 | 2.0170E−01 |
| −3.0686E+20 | −2.3052E−02 | −2.1231E−01 | −1.7513E−01 | 4.7058E−01 | −3.1764E−01 |
| −1.4505E+01 | −1.0165E−01 | 2.5879E−02 | −1.7614E−02 | 7.7411E−03 | −1.9957E−03 |

Figure 4:
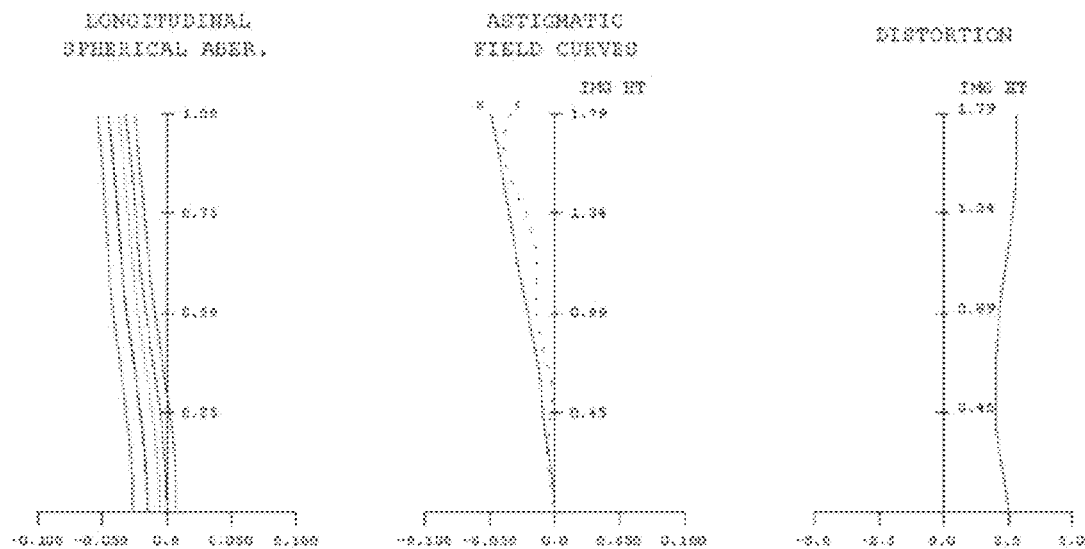
FIG. 4 shows a longitudinal spherical aberration curve, an astigmatic field curve and a distortion curve of the imaging lens assembly shown in FIG. 2.

FIG. 4 shows a longitudinal spherical aberration curve, astigmatic field curve and distortion curve of the imaging lens assembly according to Embodiment 2 shown in FIG. 2. The reference wavelengths corresponding to the longitudinal spherical aberration are 656.28 nm, 587.56 nm, 546.07 nm, 486.13 nm, and 435.83 nm. The reference wavelength corresponding to the astigmatic field curve and the distortion curve is 587.56 nm.

Table 5 shows all parameters of the imaging lens assembly of the embodiments corresponding to conditions (1)~(3).

TABLE 5

| Conditions | Embodiment 1 | Embodiment 2 |
|---|---|---|
| 0.5 < f1/f < 0.7 | 0.52 | 0.685 |
| 0.75 < TTL/2y < 1 | 0.994 | 0.976 |
| −1.2 < R2/R3 < 0 | −0.944 | −1.044 |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An imaging lens assembly, in order from an object side to an image side, substantially consisting of:
   a stop;
   a first lens having a positive refractive power, a convex object-side surface and a convex image-side surface;
   a second lens having a negative refractive power and a convex and meniscus shaped image-side surface;
   a third lens having a negative refractive power, an image-side surface being concave at a paraxial region and being convex and meniscus shaped at a peripheral region, and an object side-surface being concave at the paraxial region; the image-side surface of the third lens having an inflection point; the object-side surface of the third lens has no inflection point;
   at least one of the surfaces of three lenses being aspheric, and the imaging lens assembly satisfying following condition:

$$0 < \frac{f1}{f} < 1.0$$

wherein:
f is a focal length of the imaging lens assembly;
f1 is a focal length of the first lens.

2. The imaging lens assembly of claim 1 further satisfies the following condition:

$$0.75 < \frac{TTL}{2y} < 1.0$$

wherein:
TTL is an axial distance between the object-side surface of the first lens and the image plane;
y is a maximum image height of the imaging lens assembly.

3. The imaging lens assembly of claim 2, wherein, the image-side surfaces and the object-side surfaces of the first, second and third lenses are aspheric.

4. The imaging lens assembly of claim 3 further satisfy the following condition:

$$-1.2 < \frac{R2}{R3} < 0$$

wherein:
R2 is a curvature radius of the object-side surface of the first lens;
R3 is a curvature radius of the image-side surface of the first lens.

5. The imaging lens assembly of claim 1, wherein, an Abbe number of the second lens ranges from 20 to 30; and an Abbe number of the first lens ranges from 50 to 60.

6. The imaging lens assembly of claim 1 further satisfies the following condition:

$$0.5 < \frac{f1}{f} < 0.7$$

wherein:
f is a focal length of the imaging lens assembly;
f1 is a focal length of the first lens.

\* \* \* \* \*